(12) United States Patent
Moore (10) Patent No.: US 6,577,362 B1
(45) Date of Patent: Jun. 10, 2003

(54) PIXEL CELL FOR SILICON LC LIGHT VALVE HAVING ENHANCED STORAGE CAPACITANCE

(75) Inventor: Paul McKay Moore, San Bruno, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/317,496

(22) Filed: May 24, 1999

(51) Int. Cl.$^7$ .................. G02F 1/1335; G02F 1/1343
(52) U.S. Cl. .................. 349/114; 349/113; 349/38; 349/39
(58) Field of Search ............... 349/38, 39, 155, 349/156, 158, 113, 114

(56) References Cited

U.S. PATENT DOCUMENTS

| | | | |
|---|---|---|---|
| 4,185,894 A | 1/1980 | Hilton et al. ............ 350/338 |
| 4,239,346 A | * 12/1980 | Lloyd ............ 350/334 |
| 4,999,619 A | 3/1991 | Velde ............ 340/784 |
| 5,473,448 A | 12/1995 | Yoshinaga et al. ............ 359/51 |
| 5,515,191 A | 5/1996 | Swirbel ............ 359/81 |
| 5,543,946 A | 8/1996 | Enomoto et al. ............ 359/87 |
| 5,570,213 A | 10/1996 | Ruiz et al. ............ 359/72 |
| 5,672,937 A | 9/1997 | Choi et al. ............ 313/503 |
| 5,702,871 A | 12/1997 | Choi et al. ............ 430/314 |
| 5,706,067 A | 1/1998 | Colgan et al. ............ 349/147 |
| 5,754,159 A | 5/1998 | Wood et al. ............ 345/102 |
| 5,764,324 A | 6/1998 | Lu et al. ............ 349/113 |
| 5,838,715 A | 11/1998 | Corzine et al. ............ 372/96 |
| 5,867,237 A | 2/1999 | Yazaki et al. ............ 349/86 |
| 6,081,305 A | * 6/2000 | Sato et al. ............ 349/5 |
| 6,190,936 B1 | * 2/2001 | Moore et al. ............ 438/36 |
| 6,233,033 B1 | * 5/2001 | Moore ............ 349/139 |
| 6,300,241 B1 | * 10/2001 | Moore et al. ............ 438/637 |
| 6,303,273 B1 | * 10/2001 | Gregory ............ 430/320 |
| 6,306,561 B1 | * 10/2001 | Gregory ............ 430/320 |
| 6,313,901 B1 | * 11/2001 | Cacharelis ............ 349/187 |
| 6,356,327 B1 | * 3/2002 | Moore ............ 349/139 |

OTHER PUBLICATIONS

Colgan, E.G., et al., "On–chip metallization layers for reflective light valves", J. Res. Develop., vol. 42, No. 3/4, pp. 339–345 (May/Jul. 1998).

(List continued on next page.)

Primary Examiner—William L. Sikes
Assistant Examiner—Mike Qi
(74) Attorney, Agent, or Firm—Stallman & Pollock LLP (57) ABSTRACT

A pixel cell for a silicon LC light valve features a plurality of transparent electrically conducting pixel electrodes formed over a grounded reflective metal backplane. Dielectric material intervenes between the transparent electrodes and the grounded reflective backplane. This dielectric material, alone or in combination with the transparent electrode, creates a reflectance enhancing coating generating constructive interference of light reflected by the underlying backplane. The dielectric material also serves as the dielectric of an additional capacitive component having the active electrode and the grounded reflective metal backplane as plates. This architecture enhances the storage capacitance of the pixel cell, lowering sensitivity of the pixel to current leakage and reducing the pixel cell surface area. This pixel architecture also reduces the appearance of dark lines attributable to absorption of light in inter-pixel regions.

20 Claims, 4 Drawing Sheets

OTHER PUBLICATIONS

Takayama, S., et al., "Effects of Y or Gd addition on the structures and resistivities of Al thin films", J. Vac. Sci. Technol. A 14(4), pp. 2499–2504 (Jul./Aug. 1996).

Takayama, S., et al., "Low resistivity Al–RE (Re=La, Pr, and Nd) alloy thin films with high thermal stability for thin–film–transistor interconnects", J. Vac. Sci. Technol. B 14 (5), pp. 3257–3262 (Sep./Oct. 1996).

O'Hara, A., et al., "Planarization of Spatial Light Modulator Silicon Backplanes Using Chemical–Mechanical Polishing", The Institution of Electrical Engineers, pp. 5/1–5/6 (1994).

Castleberry, D. E., et al., "A 1 Mega–Pixel Color a–Si TFT Liquid–Crystal Display", SID 88 DIGEST, First Ed., May 1987, ISSN 0097–966X, pp. 232–234.

Glueck, J., et al., "Color–TV Projection with Fast–Switching Reflective HAN–Mode Light Valves", SID 92 DIGEST, ISSN 0097–0966X, pp. 277–280.

C. Colpaert, et al., "14.1: Characterization of Conduction in LCDs", SID 97 Digest, pp. 195–198 (1997).

Naemura, S., et al., "Liquid–Crystalline Materials for TFT–Addressed Displays with Improved Image–Sticking Properties", SID 97 Digest, pp. 199–202, (1997).

Lien, A., et al., "Image–Sticking Measurement of LCDs", SID 97 Digest, pp. 203–206, (1997).

Sato, F., et al., "L1: 2 High Resolution and Bright LCD Projector with Reflective LCD Panels", SID 97 Digest, pp. 997–1000, (1997).

Sugiura, N., et al., "42.1: Designing Bright Reflective Full–Color LCDs Using an Optimized Reflector", SID 97 Digest, pp. 1011–1014 (1997).

* cited by examiner

PIXEL CELL FOR SILICON LC LIGHT VALVE HAVING ENHANCED STORAGE CAPACITANCE

BACKGROUND OF THE INVENTION

1. Field of the Invention

The present invention relates to light valves, and in particular, to a light valve pixel cell possessing enhanced storage capacitance.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye.

Two factors dictate the minimum frequency necessary for switching. The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

Figure 1A:
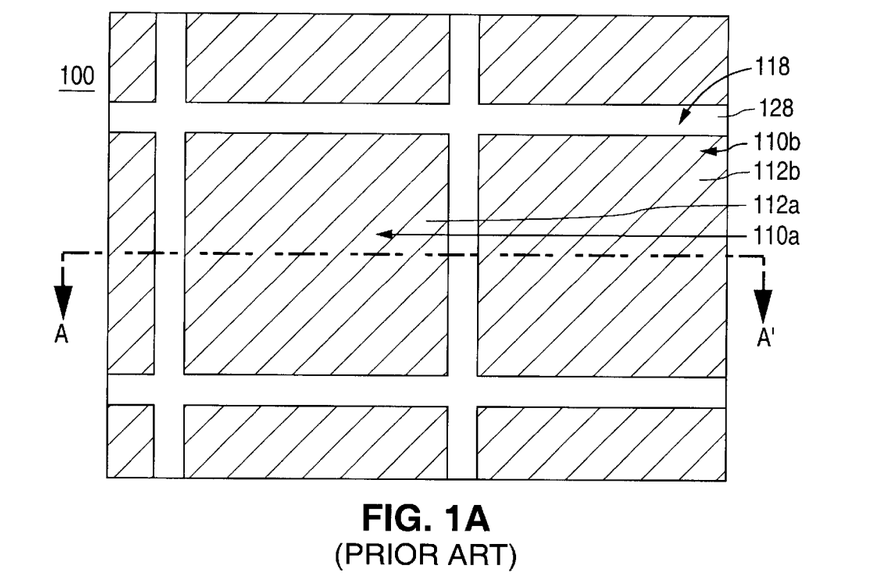
FIG. 1A shows a plan view of adjacent conventional pixel cells in a light valve.
Figure 1B:
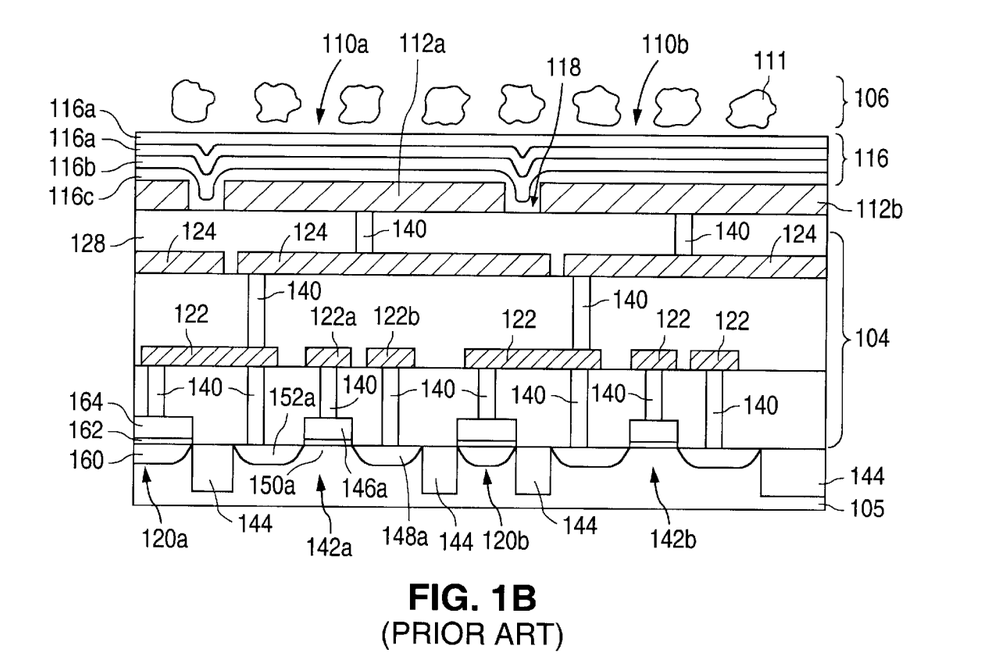
FIG. 1B shows a cross-sectional view of the adjacent pixel cells of FIG. 1A.

FIG. 1A shows a plan view of adjacent thin LC transducer pixel cells in a conventional light valve. FIG. 1B shows a cross-sectional view of the adjacent pixel cells of FIG. 1A across line A–A'. Light valve portion 100 comprises adjacent pixel cells 110a and 110b having liquid crystal (LC) material 111 sandwiched within gap 106 between a top plate and a bottom plate. The top plate is composed of a translucent material, typically glass. The underside of the top plate is coated with optically transparent and electrically conducting material, typically indium-tin oxide (ITO). This conductive layer serves as a passive electrode for the active pixels below. This passive electrode layer also typically bears a polyimide layer, which is scored to provide an anchoring alignment for the LC material 111.

The bottom plate of the pixel cell is formed by the active reflective metal pixel electrodes 112a and 112b of adjacent pixels 110a and 110b, respectively. Pixel electrodes 112a and 112b are separated and electrically isolated by trenches 118.

A reflectance enhancing coating (REC) 116 is formed over pixel electrodes 112a and 112b. REC 116 consists of optically transparent dielectric films 116a whose thickness and composition are specifically tailored to generate constructive interference of light reflected by electrodes 112a and 112b. The function and creation of such a REC is described in detail in co-pending U.S. patent application Ser. No. 08/872,013 ("the '013 application") entitled "REFLECTANCE ENHANCING THIN FILM STACK", filed Jun. 7, 1997 and hereby incorporated by reference. The '013 application describes one particularly effective embodiment of a REC that consists of alternating silicon oxide and silicon nitride films. Therefore, the REC shown in FIG. 1B includes two sets of oxide-nitride films.

Pixel electrodes 112a and 112b lie on top of an upper intermetal dielectric layer 128 that forms a component of interconnect scheme 104. Interconnect 104 overlies capacitor structures 120a and 120b formed within underlying silicon substrate 105. Capacitor structures 120 include a dielectric layer 162 formed over a double diffused drain (DDD) region 160 created within silicon substrate 105. Capacitor structures 120 further include a polysilicon contact component 164 formed over dielectric layer 162.

Storage capacitors 120a and 120b are in electrical communication with pixel electrodes 112a and 112b, respectively, through metal-filled vias 140, middle interconnect metallization layer 124, and lower interconnect metallization layer 122. Storage capacitors 120a and 120b are controlled by MOS switching transistors 142a and 142b, respectively. MOS switching transistors 142a and 142b are also formed in underlying silicon substrate 105, and are electrically isolated from adjacent semiconducting devices by trench isolation structures 144.

Figure 1C:
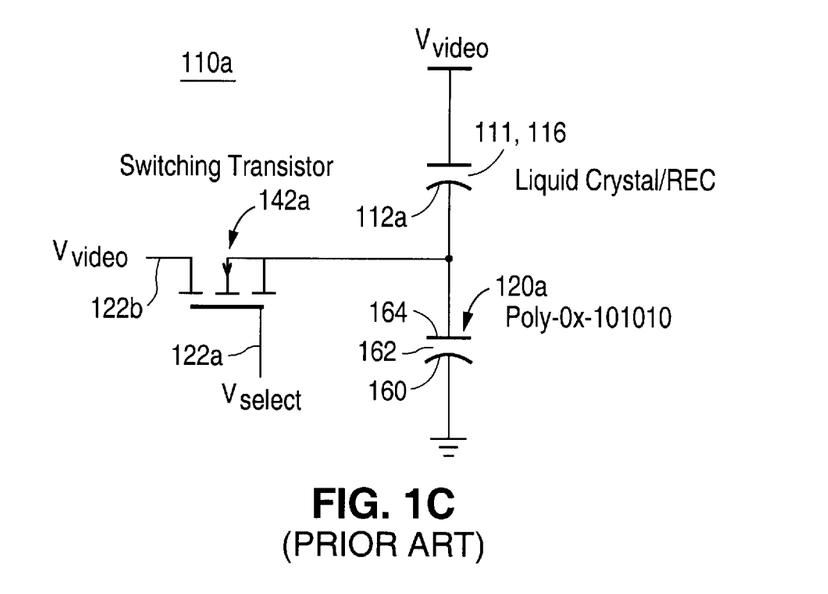
FIG. 1C depicts a circuit diagram representing the electrical behavior of the conventional pixel cell.

Operation of the conventional pixel cell is described below in conjunction with FIGS. 1A–1B and FIG. 1C. FIG. 1C depicts a circuit diagram representing the electrical behavior of conventional pixel cell 110a.

At the commencement of a write cycle for pixel 110a, gate 146a of MOS switching transistor 142a receives a select voltage ($V_{select}$) through first portion 122a of lower interconnect metallization 122. $V_{select}$ activates MOS switching transistor 142a, permitting a video voltage signal ($V_{video}$) appearing at drain 148a of MOS switching transistor 142a from second portion 122b of lower interconnect metallization 122 to be transmitted to capacitor structure 120a through channel 150a and source 152a of transistor 142a. $V_{video}$ is in turn transmitted through interconnect 104 to active electrode 112a, causing overlying LC material 111 to exhibit a particular transmission.

The light valve then addresses the next pixel cell 110b. The $V_{select}$ voltage is no longer applied to gate 146a of MOS switching transistor 142a, and the $V_{video}$ voltage is no longer applied to drain 148a. However, $V_{video}$ is maintained on active pixel electrode 112a by storage capacitor 120a, until the next write cycle occurs.

FIG. 1C shows that there are actually two capacitive components present in conventional pixel cell 110a. The first capacitive component is storage capacitor 120a created by DDD 160, dielectric layer 162, and polysilicon element 164. The second capacitive component of conventional pixel cell 110a is formed by combination of REC 116 and the LC material 111 itself, which form a dielectric between active electrode 112a and the overlying passive electrode.

The conventional pixel cell described above in FIGS. 1A–1C functions adequately in many applications. However, this design suffers from a number of disadvantages.

One problem is that light incident to array 100 may penetrate through gap between adjacent pixel electrodes 112a and 112b. Intermetal dielectric layer 128 below trench 118 is substantially transparent to this incident light, which next encounters middle interconnect metallization layer 124. Metallization layer 124 likely bears an anti-reflective coating as a result of prior photolithographic steps. As a result, light incident to inter-pixel regions is absorbed rather than reflected, and is perceived by a viewer as a dark line. This dark inter-pixel region contrasts with the bright surrounding reflective pixel electrodes. Projection displays can magnify the light reflected from pixel array to such an extent that the non-reflective space between pixels is readily observable and may distort the image.

Therefore, there is a need in the art for a pixel cell and a process of forming a pixel cell having inter-pixel regions which exhibit reflectance comparable to that of pixel regions.

Another problem associated with the conventional pixel cell design is flickering of the image due to fluctuation in the bias of the active electrode between successive write states.

One cause of flicker is a decline in voltage of the active pixel electrode due to current leakage between successive write states. Current leakage can arise from a number of sources.

One prominent leakage current path is between the source of the MOS switching transistor and the grounded DDD component of the adjacent storage capacitor. This leakage path is particularly problematic where LOCOS isolation is created between these structures. Another important leakage current path is between the source of the MOS switching transistor and the substrate under reverse bias conditions.

A third significant leakage current path is across the LC material itself. Recall from FIG. 1C that the LC material forms a dielectric between the charged active and passive electrodes. The LC material is primarily nonconductive. However, the LC material contains mobile ions which migrate to the surfaces of the active and passive pixel electrodes when the LC is subjected to an electric field. This migration of mobile ions can prevent a static voltage from being applied across the thickness of the LC material. Application of a non-static voltage across the LC produces changed optical transmission that is manifested as flickering.

Therefore, there is a need in the art for a pixel cell and a process for forming a pixel cell which minimizes flickering due to current leakage in the pixel cell circuit.

Another source of image flicker is the appearance of DC offset voltage across the liquid crystal material. Because of certain physical properties of LC material, LC displays typically alternate between positive and negative biases of equivalent magnitudes over successive write states.

In the conventional pixel cell shown in FIGS. 1A–1C, the layers of material enclosing the LC are not symmetrical. Specifically, the LC is sandwiched between an active electrode composed of a reflective metal, and a passive electrode composed of an optically transparent material such as ITO. This asymmetry in orientation of material boundaries around the LC gives rise to a DC offset voltage across the LC. This DC offset voltage can disturb the equivalency in magnitude of the positive and negative biases applied to the active electrode over successive write states. This bias variation at the electrode can in turn cause flickering of the image.

Therefore, there is a need in the art for a pixel cell and a process for forming a pixel cell which prevents flickering due to a DC offset voltage across the LC material.

An additional problem with the conventional LC pixel cell is that the intervening REC between the active pixel electrodes and the LC material increases the necessary voltage to induce a change in orientation of the overlying LC. This increased voltage requirement means that the underlying switching transistors must be capable of withstanding the high voltages, complicating fabrication and increasing the cost of the device.

Therefore, there is a need in the art for a pixel cell and a process of forming a pixel cell that places the electrically conducting active pixel electrode as close as possible to the overlying LC in order to reduce the voltage requirements of the cell.

A further problem with the conventional LC pixel cell is the space occupied by the device. Because of intrinsic limitations in the permitivity of the dielectric material formed between the DDD region and the polysilicon element, the storage capacitor structure depicted in FIG. 1B occupies large amounts of silicon substrate surface area. This space consumption is amplified by utilization of many individual pixel cells to form an array.

Therefore, there is a need in the art for a pixel cell and a process of forming a pixel cell which occupies a smaller surface area.

SUMMARY OF THE INVENTION

The present invention provides a pixel cell and a process flow for forming a pixel cell that features a plurality of transparent conductive pixel electrodes formed over a grounded reflective metal backplane. Intervening between the electrodes and the backplane is a reflectance enhancing coating generating constructive interference of incident light reflected by the underlying backplane. This pixel cell architecture enhances the storage capacitance of the pixels by creating capacitive coupling between the active electrode and the grounded metal backplane. The pixel cell of the present invention also reduces the incidence of dark lines associated with non-reflective inter-pixel regions, lowers voltage requirements, and prevents flickering attributable to asymmetrical orientation of different material layers about the LC.

A process flow for forming a pixel cell in accordance with one embodiment of the present invention comprises the steps of forming an intermetal dielectric layer, and forming a first via and a second via through the intermetal dielectric layer. The first via is filled with electrically conducting material to form a first via plug, the first via plug in electrical communication with an underlying capacitor structure. The second via is filled with electrically conducting material to form second via plug, the second via plug in electrical communication with a ground. A reflective metal layer is formed over the intermetal dielectric layer. The reflective metal layer is etched to form a non-grounded metal portion in contact with the first via plug and a grounded reflective metal surface in contact with the second via plug. A dielectric layer is formed over the grounded reflective metal surface and the non-grounded metal portion. A third via is formed through the dielectric layer. The third via is filled with electrically conducting material to form a third via plug, the third via plug in electrical contact with the non-grounded metal portion. An optically transparent electrically conducting pixel electrode is formed on top of the dielectric layer and in electrical contact with the third via plug.

A pixel cell in accordance with one embodiment of the present invention comprises an intermetal dielectric layer having a first via and a second via filled with electrically conducting material, the first filled via in electrical communication with an underlying capacitor structure and the second filled via in electrical communication with a ground. A reflective metal backplane is positioned on top of the intermetal dielectric layer, the reflective metal backplane including a non-grounded metal portion in electrical contact with the first filled via and a grounded reflective metal surface in contact with the second filled via. A dielectric layer is positioned on top of the reflective metal backplane, the dielectric layer including a third via filled with electrically conducting material. A transparent electrically conducting pixel electrode is positioned over the dielectric layer and in electrical contact with the third filled via.

The features and advantages of the present invention will be understood upon consideration of the following detailed description of the invention and the accompanying drawings.

DETAILED DESCRIPTION

U.S. Pat. No. 5,764,324 ("the '324 patent") is entitled "Flicker-Free Reflective Liquid Crystal Cell". The '324 patent describes a pixel cell for a silicon light valve which utilizes an optically transparent active electrode formed from indium-tin oxide. This transparent active electrode is formed over a reflective metal layer.

The pixel cell described by the '324 patent addresses several of the problems of the prior art pixel cell shown in FIGS. 1A–1C. Specifically, the pixel cell of the '324 patent sandwiches LC material between active and passive pixel electrodes composed of the same material (indium-tin oxide). This configuration eliminates flickering of the pixel cell attributable to the DC offset voltage discussed above.

However, the pixel cell design of the '324 patent retains some critical disadvantages of the prior art. For example, spacing between pixels is still defined by the break in the reflective metal layer circumscribing the pixel electrode. These inter-pixel regions continue to present nonreflective areas which are perceived by an observer as dark lines. Moreover, the '324 patent does not correct flickering attributable to current leakage between consecutive write states.

Figure 2A:
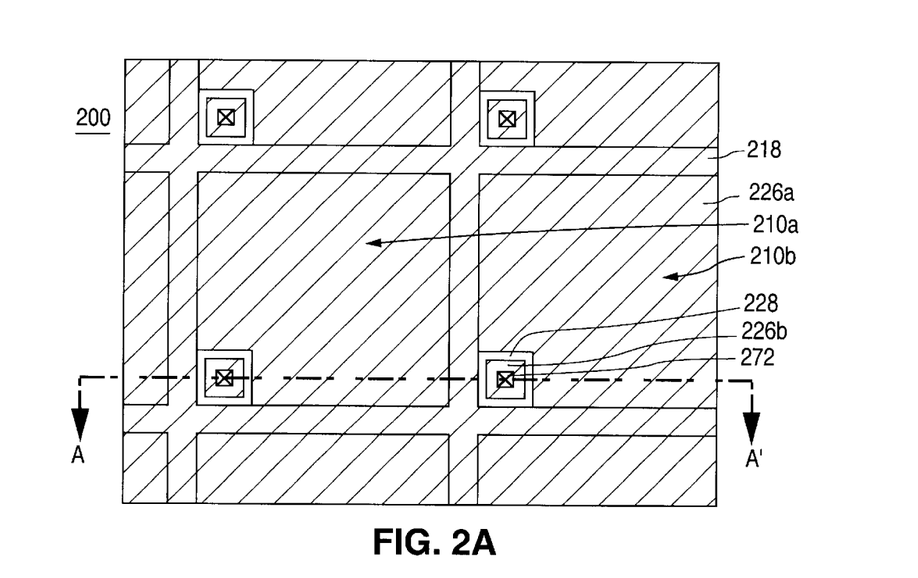
FIG. 2A shows a plan view of adjacent pixel cells in accordance with the first embodiment of the present invention.
Figure 2B:
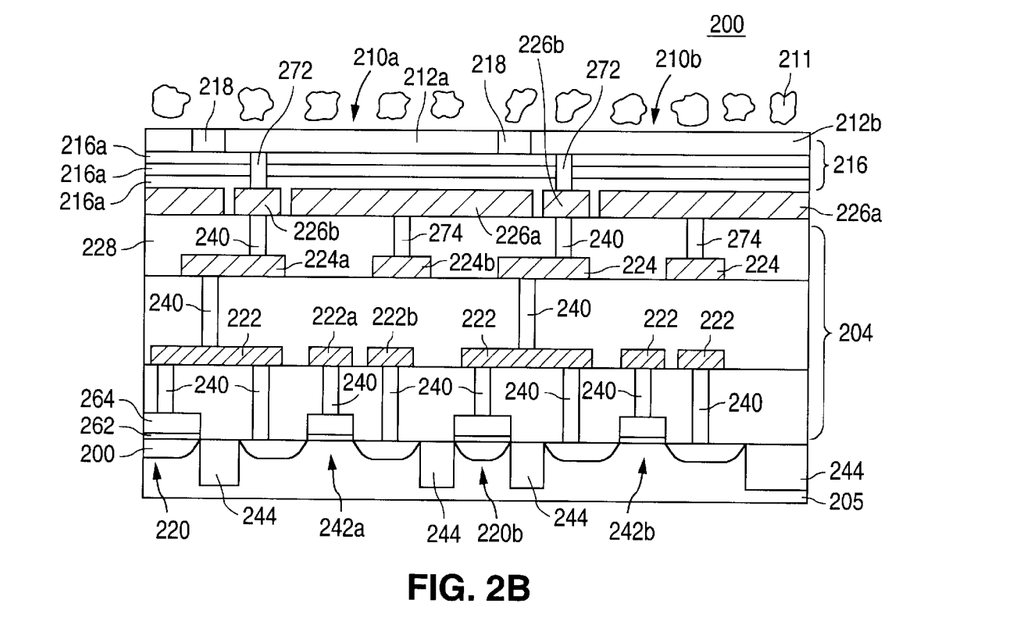
FIG. 2B shows a cross-sectional of the adjacent pixel cells of FIG. 2A.

The present invention proposes forming an active transparent electrode over a grounded reflective backplane, the active electrode electrically isolated from the grounded reflective backplane by a REC. FIG. 2A shows a plan view of adjacent pixel cells of an array in accordance with one embodiment of the present invention. FIG. 2B shows a cross-sectional view of the adjacent pixel cells of FIG. 2A along line A–A'.

Light valve portion 200 comprises adjacent pixel cells 210a and 210b having liquid crystal (LC) material 211 formed above. Active transparent electrodes 212a and 212b of pixels 210a and 210b respectively, are separated and electrically isolated by trench 218 containing dielectric materials.

Transparent active pixel electrodes 212a and 212b are separated from grounded reflective metal surface 226a by reflectance enhancing coating (REC) 216. REC 216 consists of one or more optically transparent dielectric films 216a whose thickness and composition are specifically tailored to generate constructive interference of light reflected by the underlying grounded metal surface 226a.

In the embodiment shown in FIG. 2B, REC 216 is composed of three dielectric films in order to endow pixel cell 200 with a reflectance similar pixel cell 100 shown in FIGS. 1A–1B. To understand this, recall that the co-pending '013 application previously mentioned describes formation of a REC consisting of alternating silicon oxide and nitride films. Pixel cell 100 thus includes two sets of oxide/nitride films.

Indium-tin oxide has optical properties similar to that of silicon nitride. Therefore, the top optically transparent electrically conducting layer not only forms active pixel electrodes 212a and 212b, but may also form the top layer of reflectance enhancing coating 216, aiding in generating constructive interference of light reflected by grounded reflective metal surface 226a and non-grounded metal portion 226b.

Grounded reflective metal surface 226a lies on top of an upper intermetal dielectric layer 228 that forms a component of interconnect scheme 204. Interconnect 204 overlies capacitor structures 220a and 220b formed within underlying silicon substrate 205. Underlying capacitors 220a and 220b are in electrical communication with pixel electrodes 212a and 212b, respectively, through electrically conducing first via plugs 240, lower interconnect metallization layer 224, middle interconnect metallization layer 222, non-grounded metal portion 226b, and electrically conducting second via plugs 272. Capacitors 220a and 220b are activated and deactivated by MOS switching transistors 242a and 242b, respectively. Transistors 242a and 242b are also formed in underlying silicon substrate 205, and are electrically isolated from adjacent semiconducting devices by isolation trenches 244.

Reflective metal surface 226a is in electrical communication with ground through electrically conducting third via plugs 274 and second portion 224b of upper interconnect metallization 224.

One consequence of the pixel cell architecture shown in FIGS. 2A and 2B is reduction in the dark lines associated with light absorption in inter-pixel regions. This is because grounded reflective metal surface 226a forms a nearly continuous backplane beneath the active transparent pixel electrodes. Grounded reflective metal surface 226a is interrupted only to provide electrical isolation of non-grounded reflective metal portion 226b from grounded reflective metal surface 226a.

Another result of the pixel cell design of FIGS. 2A and 2B is reduction in sensitivity to leakage current. To understand this, recall that current leakage in the pixel cell circuit will cause bias maintained on the active electrodes by the storage capacitors to fall between successive write states. This reduction in the effective bias of the active pixel electrodes will cause a change in the reflectance of the pixel cell perceived as "flicker" by a viewer.

However, one feature of the pixel cell architecture of the present invention is enhancement in the overall storage capacitance of the pixel cell. This is because the active pixel electrodes are not in direct electrical contact with the underlying reflective metal backplane. Rather, the active transparent pixel electrodes are capacitively coupled with a grounded reflective metal backplane through the REC. This is best illustrated in FIG. 2C, which shows a circuit diagram representing the electrical behavior of the pixel cell in accordance with the present invention.

Figure 2C:
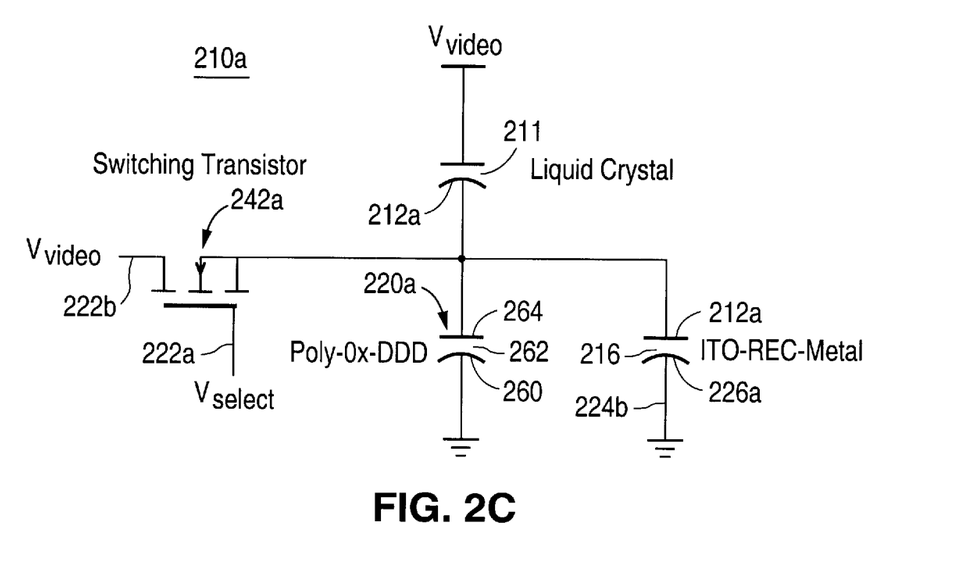
FIG. 2C depicts a circuit diagram representing the electrical behavior of the pixel cell in accordance with the present invention.

FIG. 2C shows three separate capacitive components of the pixel cell of FIGS. 2A–2B. The first capacitive component is created by application of a potential difference across the dielectric liquid crystal material all between active pixel electrodes 212a and the passive electrode. This capacitive component is present in both the conventional pixel design and the pixel design in accordance with the present invention.

The second capacitive component shown in FIG. 2C is the storage capacitor structure 220a. This capacitive component is created by the application a potential difference across oxide layer 262 positioned between DDD region 260 in silicon substrate 205 and overlying polysilicon contact layer 264. This capacitive component is also present in both the conventional pixel design and the pixel design in accordance with the present invention.

The third capacitive component shown in FIG. 2C is the capacitor structure formed between active pixel electrode 212a and the underlying grounded reflective metal surface 226a. This third capacitive component is generated by application of potential difference across REC 216, and is not present in the conventional pixel cell where the reflective metal surface also serves as the active pixel electrode. This third capacitive component is also absent from the pixel cell disclosed by the '324 patent because the active ITO electrode is in direct electrical contact with the underlying reflective metal backplane.

The presence of the third capacitive component shown in FIG. 2C creates substantial additional storage capacitance. This additional storage capacitance permits the device engineer additional leeway in determining an operational bias for the active electrode that will not be appreciably affected by minor current leakage between successive write states.

FIGS. 3A–3G show cross-sectional views illustrating the process steps for forming an array of pixel cells in a light valve in accordance with the first embodiment of the present invention.

Figure 3A:
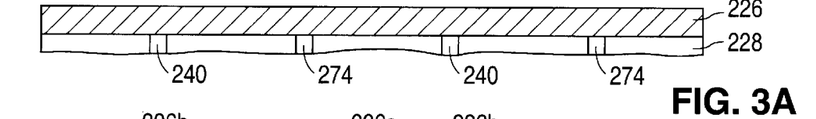
FIGS. 3A–3G show cross-sectional views of the process steps for forming an array of pixel cells in accordance with the first embodiment of the present invention.

FIG. 3A shows the starting point for the process, wherein reflective metal layer 226 is formed over intermetal dielectric layer 228. Intermetal dielectric layer 228 already contains electrically conducting first via plugs 240 and third vias 274 which provide a conductive path to the underlying interconnect metallization.

Figure 3B:
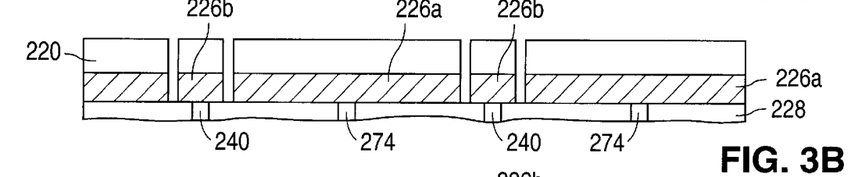

FIB. 3B shows patterning of first photoresist mask 280 over first reflective metal layer 226. Reflective metal layer 226 is etched in unmasked regions to create non-grounded reflective metal portion 226b in contact with first via plugs 240, and grounded metal surface 226a in contact with third via plugs 274.

Figure 3C:
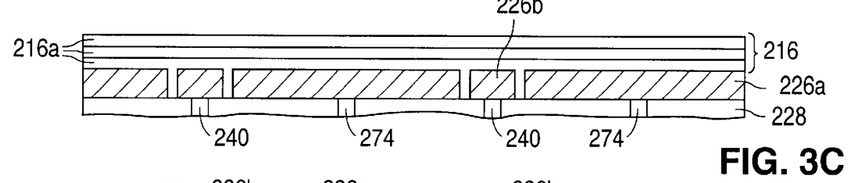

FIG. 3C shows formation of a reflectance enhancing coating 216 over the entire surface. As discussed above in connection with U.S. patent application Ser. No. 08/872, 013, REC 216 is composed of one or more dielectric films 216a whose composition and thickness is carefully tailored to generate constructive interference of reflected light. A portion of REC 216 penetrates into gaps between grounded reflective metal surface 226a and non-grounded metal portions 226b.

Figure 3D:
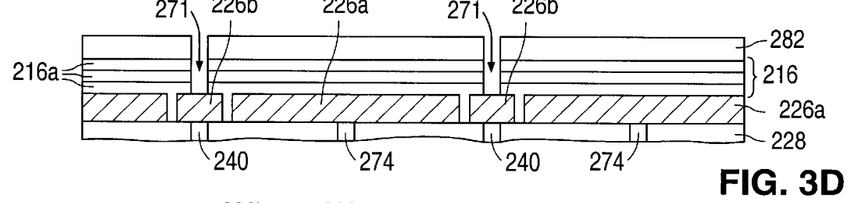

FIG. 3D shows patterning of via photoresist mask 282 over REC 216. Via photoresist mask 282 exposes regions overlying non-grounded metal portions 226b. Etching of REC 216 in unmasked regions selective to non-grounded metal portion 226b creates second vias 271.

Figure 3E:
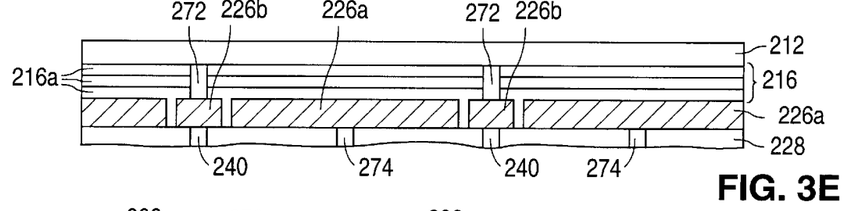

FIG. 3E shows the filling of second vias 271 of FIG. 3D with electrically conducting material to form second via plugs 272, followed by removal of this electrically conducting material outside of second vias 271. Transparent electrically conducting active pixel electrode layer 212 is then formed on top of REC 216 and second via plugs 272. Transparent, electrically conducting layer 212 is composed of the same material as the passive electrode to be formed on the underside of the top plate, typically indium-tin oxide.

Figure 3F:
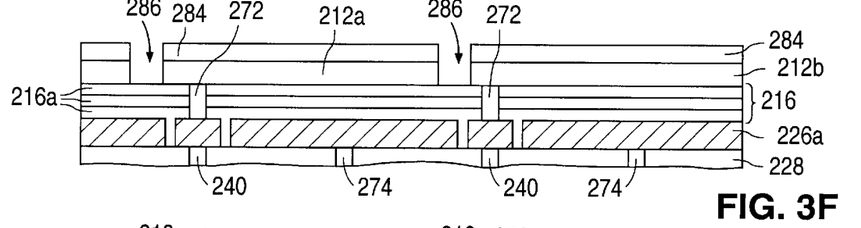

FIG. 3F shows patterning of electrode photoresist mask 284 over transparent electrically conducting layer 212. Electrode photoresist mask 284 excludes inter-pixel regions 286. Etching of transparent, electrically conducting layer 212 in unmasked inter-pixel regions 286 selective to underlying REC 216 creates discrete active pixel electrodes 212a and 212b. Active pixel electrodes 212a and 212b are in electrical communication with non-grounded reflective metal portion 226b through second via plugs 272. Non-grounded reflective metal portion 226b is in electrical communication with the underlying capacitor structures through first via plugs 240. Grounded reflective metal surface 226a is in electrical communication with grounded first portions 224a of middle interconnect metallization 224 through third via plugs 274.

Fabrication of the liquid crystal silicon light valve is completed by forming a scored polyimide alignment layer over the electrode, adding liquid crystal material, and then sealing a translucent top plate bearing an ITO passive electrode and scored alignment layer over the structure.

The thin LC transducer pixel cell and the process for forming this pixel cell in accordance with the present invention offers a number of important advantages. One important advantage of the present invention is that the individual pixel cells are now endowed with substantially greater storage capacitance. This enhanced storage capacitance offers several benefits.

First, the pixel cell occupies less surface area. This is because some of the capacitance of the cell is shifted to the ITO-REC-Metal capacitive component, thereby reducing the area consumed by the DDD-Ox-Poly storage capacitive component.

A second benefit conferred by enhanced capacitance is reduced sensitivity to current leakage. Because the charge storing capacity of the pixel cell is elevated, the total charge stored by the capacitor and applied to the active electrode is less seriously affected by a loss of charge due to leakage. The result is a pixel cell having increased tolerance to current leakage between successive write states.

Another advantage of the pixel cell in accordance with the present invention is that there is no intervening REC between the electrically conducting active pixel electrode and the overlying LC material. The proximity of the active electrode to the LC means that less overall voltage must be applied to the active electrode to alter the orientation and hence optical transmission of the LC.

An overall lower applied voltage confers a couple of important benefits to the pixel cell. First, a reduction in applied voltage allows an equivalent capacitance to be achieved utilizing a smaller capacitor structure. This translates into a more compact pixel cell and permits fabrication of arrays having higher pixel densities and hence finer resolution.

A second benefit of reduction in applied voltage is generation of displays having greater contrast. Liquid crystal material typically exhibits reduced sensitivity to applied voltage at higher contrast levels. This means that where the LC is already oriented to produce a high contrast, proportionally greater voltages must be applied to produce even greater contrast. By reducing the overall voltage applied to the active electrode, the present invention facilitates application of sufficiently high voltages to produce the contrast necessary for modern daylight display applications.

A further advantage of the pixel cell of the present invention is that a nearly continuous reflective backplane is created behind the transparent pixel electrodes. Breaks in the underlying reflective metal surface are necessary only to permit electrical isolation of vias providing electrical contact with the overlying active electrodes. The perimeter of these vias is much smaller than the perimeter of the entire electrode. Thus, the relative surface area of the break in the reflective backplane is much reduced compared with the conventional pixel cell array. This architectural feature of the present invention significantly reduces the appearance of dark, non-reflective lines in the image.

An additional advantage of the pixel cell in accordance with the present invention is that by positioning the active electrode adjacent to the LC, a symmetrical stack of conducting material is created around the LC. Specifically, the same transparent electrically conducting material forming the active and passive pixel electrodes is disposed proximate to the LC material. This symmetrical arrangement aids in preventing DC offset voltages from arising across the LC. This prevents flickering due to changes in the absolute value of electrode bias between successive write states.

Although the invention has been described in connection with one specific preferred embodiment, it must be understood that the invention as claimed should not be unduly limited to this embodiment. Various other modifications and alterations in the structure and process will be apparent to those skilled in the art without departing from the scope of the present invention.

For example, while the above discussion describes the active and pixel electrodes as both being formed from indium-tin oxide, the present invention is not limited to this specific material. The active and passive electrodes could be composed of any optically transparent electrically conducting material, including but not limited to indium oxide, tin oxide, and zinc oxide.

Moreover, FIGS. 2B and 3A–3G show a pixel array featuring a REC having four layers, the present invention is not limited to this particular reflectance enhancing coating. The present invention could be utilized with a REC composed of any number of layers having a variety of compositions.

Furthermore, while the embodiments of the present invention depicted in FIGS. 2A–3G depict a pixel array featuring a REC lying between the transparent electrode and the reflective metal backplane, this is not required by the present invention. A single dielectric layer formed over a freshly-deposited reflective metal backplane to preserve the reflective surface (but which does not generate constructive interference of reflected light) could be utilized in lieu of a REC in accordance with an alternative embodiment of the present invention.

Moreover, FIG. 3C shows the space between the grounded reflective surface and the non-grounded metal portion of the highest interconnect metallization layer as filled with dielectric material from the first REC layer. However, a separate processing step could be specifically allocated for this purpose, for example HDPECVD of silicon dioxide or silicon nitride.

Figure 3G:
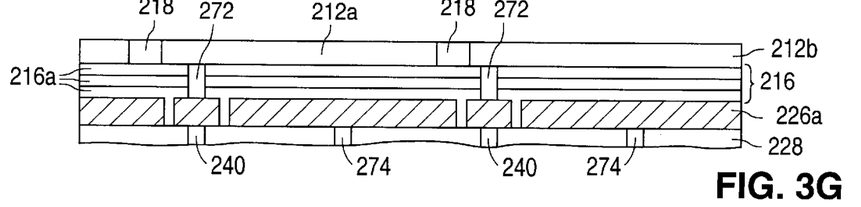

Finally, FIGS. 3F–3G describe etching of the transparent electrically-conducting layer to form a plurality of discrete active pixel electrodes separated by dielectric filled trenches. However, this etching step is not required, and the discrete active electrodes could be formed by other processing steps.

For example, U.S. patent application Ser. No. 09/204,825 ("the 3 825 application") discloses pixel cells with electrodes electronically isolated from one another by dielectric spacer walls flush with the electrode surface. The pixel array is created by forming a series of intersecting raised dielectric spacer walls, forming metal over the walls, and then chemical-mechanical polishing the metal to expose the tops of the walls. The '825 application is hereby incorporated by reference.

The process disclosed by the '825 application could also be employed to form the pixel cell in accordance with the present invention. Spacer walls could be created over the REC prior to formation of the transparent electrically conducting layer.

Given the multitude of embodiments described above, it is therefore intended that the following claims define the scope of the present invention, and that the structures and processes within the scope of these claims and their equivalents be covered hereby.

What is claimed is:

1. A process for forming a pixel cell comprising the steps of:

forming an intermetal dielectric layer;

forming a first via and a third via through the intermetal dielectric layer;

filling the first via with electrically conducting material to form a first via plug, the first via plug in electrical communication with an underlying capacitor structure;

filling the third via with electrically conducting material to form third via plug, the third via plug in electrical communication with a ground;

forming a reflective metal layer over the intermetal dielectric layer;

etching the reflective metal layer to form a non-grounded metal portion in contact with the first via plug and a grounded reflective metal surface in contact with the third via plug;

forming a dielectric layer over the grounded reflective metal surface and the non-grounded metal portion;

forming a second via through the dielectric layer;

filling the second via with electrically conducting material to form a second via plug, the second via plug in electrical contact with the non-grounded metal portion; and forming an optically transparent electrically conducting pixel electrode on top of the dielectric layer and in electrical contact with the second via plug.

2. The process according to claim 1, and wherein the step of forming an optically transparent electrically conducting pixel electrode comprises:

forming a layer of optically transparent electrically conducting material on top of the dielectric layer;

patterning an electrode photoresist mask over the layer of optically transparent electrically conducting material, the electrode photoresist mask excluding a perimeter of the optically transparent-electrically conducting material; and etching the layer of optically transparent electrically conducting material in unmasked regions to stop on the dielectric layer and create the optically transparent electrically conducting pixel electrode.

3. The process according to claim 1, and wherein the step of forming an optically transparent electrically conducting pixel electrode comprises;

forming a raised dielectric spacer wall around a perimeter of the dielectric layer;

forming a layer of optically transparent electrically conducting material over the dielectric layer and the spacer wall;

chemical-mechanical polishing the layer of optically transparent electrically conducting material to expose a top of the spacer wall.

4. The process according to claim 1, and wherein the step of forming an optically transparent electrically conducting pixel electrode includes forming a layer of composed of a material selected from the group consisting of indium oxide, tin oxide, indium-tin oxide, and zinc oxide.

5. The process according to claim 1, and wherein the step of forming the dielectric layer comprises forming at least one optically transparent dielectric film, such that the at least one dielectric film alone or in combination with the transparent electrically conducting electrode form a reflectance enhancing coating subjecting light reflected by the reflective metal layer to constructive interference.

6. A pixel cell comprising:

an intermetal dielectric layer having a first via and a third via filled with electrically conducting material, the first filled via in electrical communication with an underlying capacitor structure and the third filled via in electrical communication with a ground;

a reflective metal backplane positioned on top of the intermetal dielectric layer, the reflective metal backplane including a non-grounded metal portion in electrical contact with the first filled via and a grounded reflective metal surface in contact with the third filled via;

a dielectric layer positioned on top of the reflective metal backplane, the dielectric layer including a second via filled with electrically conducting material; and A transparent electrically conducting pixel electrode positioned over the dielectric layer and in electrical contact with the second filled via.

7. The pixel cell according to claim 6, and wherein the dielectric layer comprises at least one optically transparent dielectric film, the at least one optically transparent dielectric film alone or in combination with the transparent electrically conducting pixel electrode creating a reflectance enhancing coating subjecting light reflected by the reflective metal backplane to constructive interference.

8. The pixel array according to claim 6, and wherein the transparent electrically conducting pixel electrode is composed of a material selected from the group consisting of indium oxide, tin oxide, indium-tin oxide, and zinc oxide.

9. A pixel array for a silicon light valve comprising:

a plurality of capacitor structures formed in a silicon substrate;

an intermetal dielectric layer formed over the silicon substrate, the intermetal dielectric including electrically conducting first via plugs in contact with the capacitor structures and electrically conducting third via plugs in contact with a ground;

reflective metal backplane positioned over the intermetal dielectric layer, the reflective metal backplane including non-grounded metal portions in electrical contact with the first via plugs and grounded reflective metal surfaces in electrical contact with the third via plugs;

a dielectric layer formed over the reflective metal backplane, the dielectric layer penetrated by electrically conducting second via plugs;

transparent electrically conducting active pixel electrodes formed over the dielectric layer and in contact with the second via plugs;

a transparent top plate having an underside;

a transparent electrically conducting passive electrode formed on the underside of the transparent top plate, the passive electrode composed of the same material as the transparent electrically conducting active pixel electrodes; and liquid crystal material placed above the active electrode and below the passive electrode.

10. The pixel array according to claim 9, and wherein both the transparent active pixel electrode and the transparent passive electrode are composed of a material selected from the group consisting of indium oxide, tin oxide, indium-tin oxide, and zinc oxide.

11. The pixel array according to claim 9, and wherein the dielectric layer comprises at least one optically transparent dielectric film, the at least one optically transparent dielectric film alone or in combination with the transparent electrically conducting active pixel electrodes creating a reflectance enhancing coating subjecting light reflected by the reflective metal backplane to constructive interference.

12. A method for enhancing the storage capacitance of a pixel cell for a light valve, the method comprising the steps of:

providing a reflective interconnect metallization layer including a grounded reflective surface and a non-grounded metal portion;

providing a dielectric material over the reflective interconnect metallization layer;

providing an electrically conducting via plug through the dielectric material; and providing a transparent electrically conducting active pixel electrode over the dielectric material, the active pixel electrode in electrical communication with the non-grounded metal portion through the via plug, whereby the application of bias to the active pixel electrode through the non-grounded metal portion and the via creates capacitance between the grounded reflective metal surface across the dielectric material.

13. The method according to claim 12 wherein the dielectric material comprises at least one optically transparent dielectric film which alone or in combination with the transparent electrically conducting active pixel electrode creates a reflectance enhancing coating subjecting light reflected by the reflective interconnect metallization layer to constructive interference.

14. The method according to claim 13 wherein the step of providing a dielectric material comprises providing alternating layers of silicon oxide and silicon nitride.

15. The method according to claim 12 wherein the step of providing a transparent electrically conducting active pixel electrode comprises providing a layer composed of a material selected from the group consisting of indium oxide, tin oxide, indium-tin oxide, and zinc oxide.

16. A method for reducing light absorption in inter-pixel regions of a light valve pixel cell, the method comprising the steps of:

providing a near-continuous grounded reflective metal backplane over an intermetal dielectric layer, the grounded reflective metal backplane interrupted by trenches to electrically isolate non-grounded metal portions in communication with electrically conducting first via plugs in the intermetal dielectric;

providing a dielectric layer over the reflective metal backplane, the dielectric layer including electrically conducting second via plugs in electrical contact with the non-grounded metal portions; and providing a plurality of transparent electrically conducting active pixel electrodes over the dielectric layer, the active pixel electrodes in electrical contact with the second via plugs.

17. The method according to claim 16 wherein the dielectric layer comprises at least one optically transparent dielectric film which alone or in combination with the transparent electrically conducting active pixel electrodes creates a reflectance enhancing coating subjecting light reflected by the reflective metal backplane to constructive interference.

18. The method according to claim 17 wherein the step of providing a dielectric layer comprises providing alternating layers of silicon oxide and silicon nitride.

19. The method according to claim 16 wherein the step of providing a transparent electrically conducting active pixel electrode comprises providing a layer composed of a material selected from the group consisting of indium oxide, tin oxide, indium-tin oxide, and zinc oxide.

20. The method according to claim 16 wherein the step of providing a reflective metal backplane includes providing grounded reflective metal surfaces having a first surface area and non-grounded metal portions having a second surface area, the first surface area greater than the second surface area.

\* \* \* \* \*